UNITED STATES PATENT OFFICE.

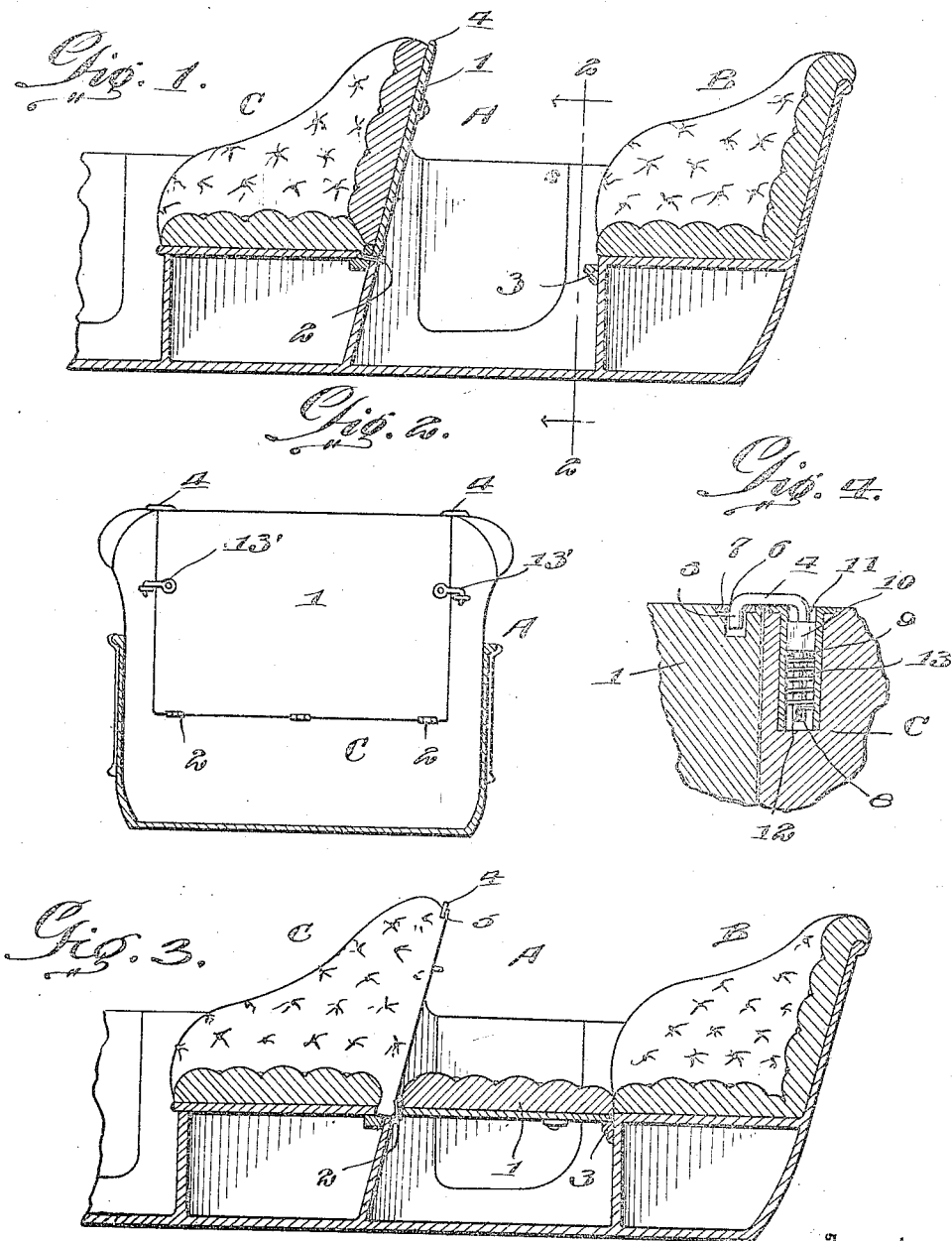

WILLIAM JEFFERSON BAXTER, OF NICHOLASVILLE, KENTUCKY.

RECLINING-SEAT FOR AUTOMOBILES.

1,204,394.  Specification of Letters Patent.  Patented Nov. 14, 1916.

Application filed September 11, 1915. Serial No. 50,256.

*To all whom it may concern:*

Be it known that I, WILLIAM J. BAXTER, a citizen of the United States, residing at Nicholasville, in the county of Jessamine and State of Kentucky, have invented new and useful Improvements in Reclining-Seats for Automobiles, of which the following is a specification.

This invention relates to reclining seats for automobiles and the like, the object in view being to produce practical means whereby in an ordinary motor car of the touring type, a section of the back of the front seat may be utilized to bridge the space between the front and back seats so as to form a substantially horizontal and bed-like structure which will be found especially valuable in carrying injured, wounded or sick persons from place to place and which will also adapt the machine for outing and touring purposes where it is desired to adapt the machine for sleeping purposes during the night time.

With the above and other objects in view, the invention consists in the novel construction, combination and arrangement of parts, as herein described, illustrated and claimed.

In the accompanying drawings:—Figure 1 is a vertical longitudinal section through the body of an automobile showing the front seat back section in its normal position. Fig. 2 is a vertical cross section through the machine on the line 2—2 looking in the direction of the arrow. Fig. 3 is a section similar to Fig. 1 showing the seat back section thrown rearwardly and downwardly for reclining purposes. Fig. 4 is a fragmentary sectional view showing one of the locking devices for holding the seat back section in its normal position.

Referring to the drawings A generally designates the body of an automobile of the touring type, comprising the rear seat B and the forward seat C.

In carrying out the present invention, the back of the front seat C is formed with a movable section 1 which is hinged to the seat bottom at 2 adapting the said movable section of the back to be swung rearwardly and downwardly to a substantially horizontal position where the free edge thereof is supported by a projecting ledge or flange 3 extending forward from the body of the rear seat and below the top surface thereof so as to permit the upholstered side of the movable section of the front seat to lie flush with the upholstered rear seat.

The means for locking the movable section 1 of the front seat in its normal position consists of a pair of locking devices one of which is illustrated in detail in Fig. 4, each locking device comprising a hook-shaped head 4 the bill or point 5 of which extends downwardly so as to pass through the openings 6 of a face plate 7 which is fastened by screws or the like to the adjacent corner of the hinged section of the front seat back. The locking device also comprises a rounded shank 8 which is slidable in a guide opening 9 formed in the stationary portion of the front seat immediately adjacent to one of the side edges of the hinged section of the back. At a suitable point the shank 8 is provided with a squared portion 10 preferably of greater diameter than the shank 8 and the hook 4 and this squared portion 10 is received in a squared socket 11 forming an extension of the opening 9 which receives the rounded portion of the shank 8. A pin 12 is inserted through the shank 8 and a coiled expansion spring 13 is interposed between said pin and the upper end of the square recess 11, said spring serving to hold the point of the hook 4 normally down and in engagement with the hinged section of the seat back. The squared portion 10 prevents the locking device from turning in either direction while permitting the same to be lifted in order to release the section 1 of the seat back. If desired, additional hooks 13' may be pivotally mounted on the section 1 of the seat back and keepers or pins therefor provided on the stationary portion of the front seat structure.

When it is desired to use the body of the car for reclining purposes, the locking members 4 are raised so as to throw the extremities thereof out of engagement with the hinged seat back section 1 and this may be easily accomplished by inserting any suitable implement under the bend of each hook. The back is then swung rearwardly and downwardly until it rests upon the supporting legs or flange 3.

Having thus described my invention, I claim:—

The combination with a support embodying a fixed section and a hinged section, of fastening means for holding said hinged section flush with the fixed section embodying a pair of vertically slidable locking members each comprising a hook-shaped upper end portion terminating in a downwardly extending point, a shank slidable in a guide way in one section of the support, a spring surrounding said shank and acting to hold the locking device in locking position, a squared enlargement on said shank for preventing said shank and hook-shaped upper portion thereof from turning, and keepers on the other section of the support with which said hook shaped portions engage substantially as described.

In testimony whereof I affix my signature in presence of two witnesses.

WILLIAM JEFFERSON BAXTER.

Witnesses:
 WM. A. SANDUSKY,
 J. H. McMURTRY.